United States Patent [19]
Delmas et al.

[11] Patent Number: 5,722,109
[45] Date of Patent: Mar. 3, 1998

[54] VACUUM CLEANER WITH FLOOR TYPE DETECTION MEANS AND MOTOR POWER CONTROL AS A FUNCTION OF THE DETECTED FLOOR TYPE

[75] Inventors: Gilles Delmas, Epinay-Sour-Sernart, France; Johannes A. T. Driessen, Nieuweroord, Netherlands

[73] Assignee: U.S. Philips Corporation, New York, N.Y.

[21] Appl. No.: 751,280

[22] Filed: Nov. 18, 1996

Related U.S. Application Data

[63] Continuation of Ser. No. 280,748, Jul. 26, 1994, abandoned.

[30] Foreign Application Priority Data

Jul. 28, 1993 [FR] France ................. 93 09277

[51] Int. Cl.⁶ ............................................. A47L 9/28
[52] U.S. Cl. .......................... 15/319; 15/339; 15/412
[58] Field of Search ................................. 15/319, 339

[56] References Cited

U.S. PATENT DOCUMENTS

| | | | |
|---|---|---|---|
| 4,958,406 | 9/1990 | Toyoshima et al. | 15/319 |
| 5,233,682 | 8/1993 | Abe et al. | 15/319 X |
| 5,265,305 | 11/1993 | Kraft et al. | 15/319 |
| 5,276,939 | 1/1994 | Uenishi | 15/319 |
| 5,381,584 | 1/1995 | Jyoraku et al. | 15/319 |

FOREIGN PATENT DOCUMENTS

| | | | |
|---|---|---|---|
| 0467347 | 1/1992 | European Pat. Off. | |
| 189355 | 7/1992 | Japan | 15/319 |

*Primary Examiner*—Chris K. Moore
*Attorney, Agent, or Firm*—Ernestine C. Bartlett; Norman N. Spain

[57] ABSTRACT

A vacuum cleaner has: an air outlet, an air inlet, a dust chamber in communication with the air inlet, a fan driven by a main motor provided in a housing in communication with the air outlet and the dust chamber, a pressure detector which provides a signal showing variations characteristic of the floor type being cleaned; and circuitry, including a neural network for recognizing and classifying the floor type as a function of these variations, a setpoint generator for determining a pressure setpoint as a function of the variations, and a control circuit for controlling the power of the main motor so as to maintain the pressure setpoint.

25 Claims, 3 Drawing Sheets

VACUUM CLEANER WITH FLOOR TYPE DETECTION MEANS AND MOTOR POWER CONTROL AS A FUNCTION OF THE DETECTED FLOOR TYPE

This is a continuation of application Ser. No. 08/280,748, filed Jul. 26, 1994 now abandoned.

FIELD OF THE INVENTION

The invention relates to a vacuum cleaner comprising a vacuum cleaner body provided with an air inlet and an air outlet, and a hose provided with a nozzle and coupled to the air inlet of the vacuum cleaner body, which body comprises a dust chamber in communication with the air inlet and a housing for a fan driven by an electric motor, called main motor, which housing is in communication with the dust chamber and the air outlet, this vacuum cleaner in addition comprising:

- detection means for characteristics of the floor type which is being cleaned,
- classification means for the floor type being cleaned as a function of the detected characteristics,
- setpoint generating means for determining an underpressure setpoint as a function of the floor type classification,
- control means for the power of the main motor so as to maintain this underpressure setpoint.

The invention finds its application in the manufacture of domestic or industrial vacuum cleaners.

BACKGROUND OF THE INVENTION

A vacuum cleaner provided with elements as described above is known from European Patent Application EP 0 467 347. The document describes a vacuum cleaner with means for controlling the motor power which drives the fan as a function of the nature or state of the floor surface rubbed by the nozzle. These means comprise:

- a first detector, which is a current detector, for detecting changes in the supply current of an electric brush arranged in the nozzle, which changes become apparent at the exact moment when a change is made from one floor type to another, for example, during floor changes between thick carpets, fine carpets, straw mats, and hard surface, and a circuit for memorizing the current peaks. During the cleaning operation, in fact, the user of the vacuum cleaner carries out forward and return movements with the brush situated in the nozzle while rubbing over the floor. Depending on the surface condition of the latter, the load applied to the brush changes, and thus its current changes. This current takes a sinusoidal form with a frequency which is equal to that of the AC supply voltage of the motor of the brush provided by the mains. This current on the other hand exhibits variations in the form of peaks in the envelope of the sinusoidal curve. These amplitude peaks of the sinusoidal curve appear at each change in direction in the brushing movement over the floor by the brush, i.e. between a forward movement when the brush is pushed over the floor and a return movement when the brush is pulled back over the floor. It is important to note that the current value represented by the amplitude of the sinusoidal curve is more or less constant between these peaks independently of the floor type. The current value varies exclusively when the peaks appear such that the amplitude of these peaks is greater for thick carpets than for fine carpets, and is smallest for hard floors. When the brush is not in contact with the floor, no peak appears;
- a second detector, which is a pressure detector, formed by a piezoelectric sensor arranged in the vacuum cleaner body and connected to a tube for detecting the air pressure in the suction compartment of the fan between the dust chamber and the suction surface of this fan so as to provide a signal which is a function of this pressure.

The vacuum cleaner known from the cited document in addition comprises:

- calculation means for providing a classification signal as to the surface state of the floor between THICK CARPET, THIN CARPET, STRAW MAT, and HARD FLOOR, based on current peaks of the electric brush at the bottom. These calculation means include a microprocessor which compares the captured current peak values with given reference current values stored in the memory. On that basis, this microprocessor establishes the floor classification through comparison with these reference current values. On the other hand, this microprocessor compares the avenge pressure values provided by the second detector with given reference pressure values present in the memory and corresponding to different possible floor types. Said microprocessor further provides a control signal for the motor power so as to obtain a pressure value at the outlet of the dust chamber which corresponds to the given pressure value stored in the memory for the relevant calculated floor type. The microprocessor may also provide a switch-off signal for the brush motor, if so desired.

This known vacuum cleaner has a disadvantage in that the floor detector is a current detector connected to the electric brush in the nozzle. Thus the detection of peaks, which renders possible the identification of the various floor types, can only be made when a brush is systematically used in the nozzle, i.e. is present and rotating. Now the systematic use of a brush is not practical. In particular, the electric brush tends to spread crumbs instead of attracting them towards the nozzle when the floor has a smooth covering or a short-pile carpet. In general, the user will want the brush to be out of action on smooth surfaces and short-pile carpets. The device described is accordingly useful only for distinguishing between thick carpets and medium carpets, in which case the peak levels of the current are found to differ insufficiently in order to carry out this distinction correctly.

SUMMARY OF THE INVENTION

The invention has for its object to provide a vacuum cleaner which renders it possible to obtain information on the floor type independently of the operation of the brush.

The invention also has for its object to provide a vacuum cleaner in which the motor power control as a function of the detected and classified floor type takes place automatically.

According to the invention, this object is achieved by means of a vacuum cleaner provided with the elements described in the opening paragraph and characterized in that:

- the detection means are formed by a pressure detector whose measuring point is directed at the inlet of the dust chamber and which provides a signal which shows variations characteristic of the nature of the floor being cleaned, while this vacuum cleaner in addition comprises:
- a sequential command system for activating, in a given order and automatically, the detection means, the classification means, the setpoint generating means, and the main-motor control means during appropriate time periods.

This vacuum cleaner offers the advantage that the detection of the floor type is very good because it results from a detector whose measurement is directly influenced by the action of the floor on the air suction flow. Since the measuring point of the pressure detector which serves as the floor type detector is placed in front of the dust chamber, in fact, the measurement on which the floor classification is based is not subject to any damping.

Moreover, this vacuum cleaner offers the advantage that the measurement does not depend on the necessary operation of the electric brush situated in the nozzle. The detection may thus be carried out for all floor types, even hard floors which are cleaned without brush.

In addition, this vacuum cleaner offers the advantage of a better resistance to wear than the known device owing to the fact that the detection is not coupled to the brush motor, because generally the brush motor of the nozzle will have a shorter working life than the main motor of the vacuum cleaner.

Moreover, this vacuum cleaner offers the advantage that the floor type detection and the ensuing suction power control are effected very quickly.

The invention also has for its object to improve the cleaning of every floor type through optimization of the determination of the setpoint value for the vacuum cleaning underpressure.

According to the invention, this object is achieved by means of a vacuum cleaner as described in the opening paragraph and characterized in that:

the detection means comprise a pressure detector whose measuring point is directed at the inlet of the dust chamber and which provides a signal which shows variations characteristic of the nature of the floor being cleaned, the classification means comprise a neuron network for recognizing and classifying floor types which are being cleaned, while this vacuum cleaner in addition comprises:

a sequential command system for activating, in a given order and automatically, the preprocessing means, the classification means, the setpoint generating means, and the main-motor control means during appropriate time periods.

This vacuum cleaner offers very many advantages:

first, the suction pressure control is greatly improved because this pressure is controlled directly at the input side of the dust chamber instead of at the output side as in the known vacuum cleaner. The pressure control is thus more precise and more satisfactory than in the known vacuum cleaner; thus, for example, the required motor power will vary in the case of a given pressure setpoint value when the degree of filling of the dust bag changes. The pressure at the inlet of the dust chamber will remain an optimum at all times;

furthermore, the detection of the floor type and the control of the desired suction pressure as a function of the detected floor type are realised by means of one and the same detector. Thus, according to the invention, the detection is not only more accurate, but the control of the working pressure is more accurate and these results are achieved with highly economical means. It will be noted that, in the known vacuum cleaner, the current detector was used solely for the detection of the floor type, and the pressure detector situated at the outlet of the dust chamber was used solely for controlling the working pressure, this control accordingly being effected at the outlet of the dust chamber. Two detectors were thus necessary for fulfilling these two functions while nevertheless the control was not achieved in a satisfactory manner. The vacuum cleaner according to the invention carries out these functions with a single detector instead of two, while in addition the pressure control is greatly improved;

if the vacuum cleaner hose is obstructed, for example by a piece of paper or cloth, the vacuum cleaner motor, which in that case is no longer correctly cooled through lack of ventilation, nevertheless does not run the risk of being overheated because now an excess vacuum is detected and the motor power is reduced with the object of achieving the pressure setpoint value at the inlet; this pressure setpoint value being inevitably less stringent than the accidental excess vacuum.

This vacuum cleaner in addition offers the advantage that the coefficients of the neuron network here form the basis of the classification of the floor type as a function of the signal from the floor type detector, and not the comparison with values stored in a table. The result is that errors due to dispersions in the characteristics in all regions of the vacuum cleaner can thus be eliminated.

The use of a neuron network for classification accordingly has major advantages. Nevertheless, the implementation of the neuron network comprises a learning phase which takes into account measurements of the pressure variations by the floor type detector. These measurements can only be used for the learning phase if they are carried out at a constant motor power. This is because a variation in the motor power also results in a variation in the pressure, which interferes with the pressure variations related purely to the floor type. The motor power control block should thus be de-activated when the floor type detector is in the analysis phase. And also, it is very important that the analysis phase should take place as often as possible so that there is no risk that the user passes from one cleaned floor to another without this change being detected.

According to the invention, these problems are resolved by means of a vacuum cleaner which is in addition characterized in that the sequential command system is a FINITE STATE unit which comprises at least the following STATES:

STATE 4/CONTROL of the electric power of the motor during a time T4 in which, a setpoint for the average pressure amplitude of the first pressure detector 14 having been previously imposed, as well as possibly a setpoint for the brush motor:
the control means are ACTIVATED,
the classification means are DE-ACTIVATED, STATE 5/WAIT until the preceding STATE has finished producing its effects, during a time T5, taking into account the time constants of the elements;

STATE 6/ANALYSIS during a time T6 which embraces at least one change in direction of the nozzle on the floor during cleaning, during which:
the control means are DE-ACTIVATED;
the preprocessing means are ACTIVATED,
the neuron network is ACTIVATED,
the setpoint generating means are ACTIVATED so as to determine:
either a new setpoint for the average pressure amplitude of the first pressure detector, and possibly a setpoint for the brush motor,
or the setpoints remain unchanged, subsequently, RETURN TO STATE 4/then to STATE 5/in which the system does not remain if the setpoints were unchanged.

BRIEF DESCRIPTION OF THE DRAWINGS

The invention will be described below in detail with reference to the annexed diagrammatic Figures, in which.

DESCRIPTION OF EMBODIMENTS

Figure 1A:
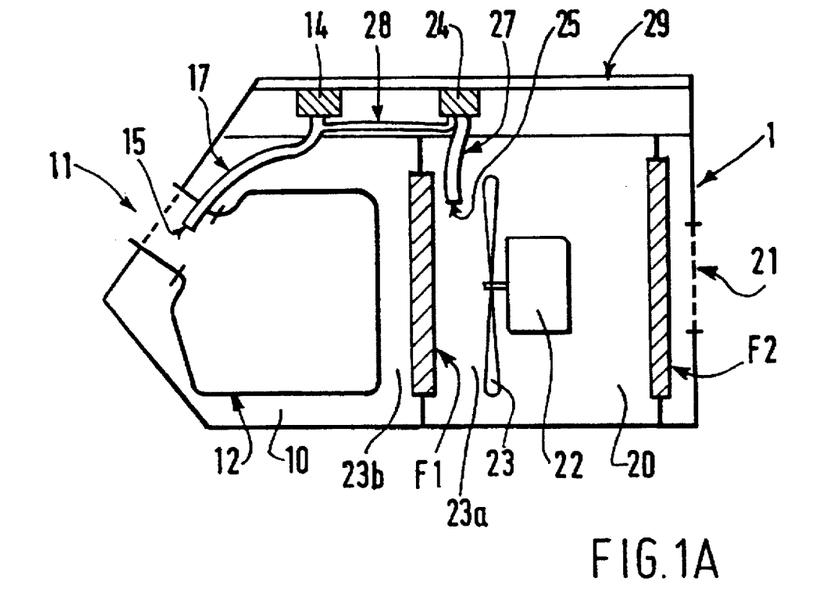
FIG. 1A shows the interior of a vacuum cleaner provided with its main elements and with two pressure detectors.
Figure 1B:
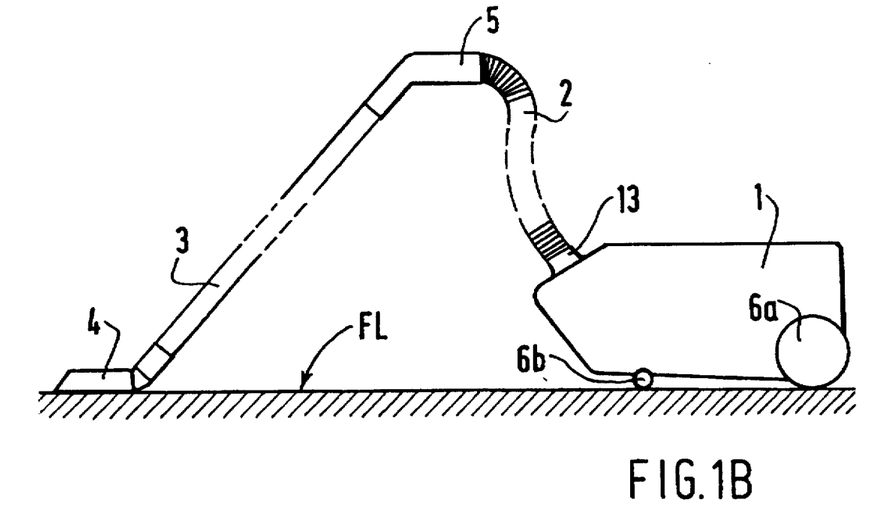
FIG. 1B shows the exterior of a vacuum cleaner fitted with a hose and a nozzle.

In FIGS. 1A and 1B, a vacuum cleaner for domestic or industrial use comprises a vacuum cleaner body 1 provided with means for easy displacement over a floor to be cleaned, for example, wheels 6a, 6b or slides, or a combination of such elements.

The vacuum cleaner body is provided with an air inlet 11 and an air outlet 21, and comprises substantially two housings:

a first housing 10 forming the dust chamber, issuing into the air inlet 11;

a second housing 20 for a fan 23 driven by a motor 22. The housing 20 of the fan and the motor issues into the dust chamber 10 at one end and into the air outlet 21 at the other end. The fan 23 has a suction side 23a facing the dust chamber 10 and an exhaust side facing the air outlet 21.

The fan housing 20 is rendered dust-proof against the dust chamber by means of a filter F1 fixedly arranged in the communication opening between the dust chamber 10 and the housing 20. The air outlet 21 is also protected against dust by means of a filter F2 fixedly arranged between the exhaust side of the fan and said air outlet 21.

The air inlet 11 is provided with a swivel coupling 13 for facilitating the rotation of the hose 2 relative to the vacuum cleaner body 1. Usually a dust bag 12 forming the filter will be fixed in the dust chamber. This bag has an opening facing towards the air inlet 11 and is inserted in the most dust-proof manner possible behind the swivel coupling 13. The use of the swivel coupling is not essential to the invention.

The vacuum cleaner in addition comprises a hose, usually formed by a flexible part 2 and a rigid extension 5, 3 which ends in a suction nozzle 4. The end of the hose opposed to the nozzle is coupled to the opening of the air inlet 11. These various components are shown in FIG. 1B.

The operation of the vacuum cleaner follows from the connection of the fan motor to an AC voltage source so as to create an underpressure in the nozzle through the action of the fan so that dust, crumbs, small fragments and other objects present on the floors to be cleaned are sucked into the unit. The cleaning operation comprises the movement of the rigid pan of the hose by the user, who moves the nozzle to and fro over the floor FL to be cleaned, performing forward strokes and return strokes of the nozzle over the floor in a pseudo-periodical manner, the pseudo-period of one forward-return operation being of the order of 0.5 to approximately 2 seconds.

When the nozzle is pushed forward by the user by means of the rigid part of the hose, in the forward stroke portion of the pseudo-period, the nozzle is pressed against the floor and the air resistance is increased thereby, the flow in the hose is reduced, and it follows that the underpressure in the vacuum cleaner hose is increased.

When the nozzle is pulled back, on the other hand, in the return portion of the period, the nozzle is slightly lifted from the floor to be cleaned, and the underpressure in the vacuum cleaner hose becomes less.

Upon a change in direction of the nozzle, accordingly, i.e. between a forward stroke and a return stroke and vice versa, a change in the underpressure will appear. This change is also pseudo-periodical, accompanying the pseudo-periods of the forward-return strokes of the nozzle. These variations in the underpressure at the level of the hose, which may also be called oscillations in the amplitude of the pressure in the nozzle and the hose, form quantities which are measurable.

In fact, each forward stroke of the nozzle in this pseudo-periodical variation corresponds to an underpressure amplitude maximum, and each return stroke of the tube corresponds to an underpressure amplitude minimum in the vacuum cleaner hose. It should be noted that the underpressure amplitude value remains a maximum throughout the forward stroke, just as the underpressure amplitude remains a minimum throughout the return stroke. The pressure variation between the maximum and the minimum underpressure is an abrupt one, corresponding to a sudden change in direction of the nozzle on the floor. Thus the curve representing the pressure amplitude as a function of time practically takes the form of a pseudo-periodical square-wave signal.

The pressure amplitude difference between the forward and return strokes, i.e. the difference between the pressure amplitude or value at the maxima and the pressure amplitude or value at the minima of the pseudo-periodical variation, depends strongly on the surface condition or the type of floor to be cleaned. Thus, this difference in amplitude of the oscillations is great when the forward and return strokes of the nozzle are carried out over a thick carpet; this amplitude difference decreases as the carpet thickness decreases; and the amplitude difference is almost zero on a hard, smooth surface.

On the other hand, the average pressure amplitude in the hose, i.e. the average value of the amplitude measured between the amplitude maxima and minima relative to the zero pressure, also depends strongly on the surface condition or type of floor to be cleaned. This average amplitude is great when the nozzle lies against a thick carpet; it diminishes as the carpet thickness diminishes, and it has a minimum value, not equal to zero, when the nozzle lies against a hard surface.

These pressure amplitude variations may be measured in the nozzle of the vacuum cleaner. It is preferable for practical constructional reasons, however, to measure them at the level of the air inlet 11 of the vacuum cleaner body 1.

These variations are also observable in the portion of the vacuum cleaner body situated at 23a between the dust chamber and the fan, or alternatively at 23b at the outlet of the dust chamber. At these locations, however, the oscillations are damped by the presence of the dust and of various filters (dust bag 12 and possibly filter F1) themselves.

Therefore, a measurement carried out at the level of the air inlet 11 corresponds more closely to the pressure conditions prevailing at the nozzle itself and provides a more accurate indication of the surface condition of the floor.

This measurement of the pressure amplitude variations which take place at each change in direction of the nozzle is carried out by means of a pressure detector 14 whose measuring point 15 is situated at the level of the air inlet 11, for example, between the swivel coupling 13 and the dust bag 12. This pressure detector may be a silicon detector provided with a flexible tube 17 whose end is directed at the measuring point 15. The body of the detector 14 itself may be fixed against a circuit board 29 arranged in the vacuum cleaner body 1 outside the path of the air flow.

It appears on the other hand that the pressure variations in the course of the forward and return strokes on the same floor type and at a same motor power are slightly influenced by the degree of filling of the dust chamber. In order to improve the reliability of the floor type detection, therefore, a measurement of the pressure difference between the inlet and the outlet of the dust chamber is provided.

For this purpose, a second pressure detector 24 of the same type as the first pressure detector 14 is arranged in the vacuum cleaner body, provided with a flexible tube 27 whose end is directed at the point of measurement 25 at the suction side 23a of the fan. The body of the pressure detector 24 may be fixed to a circuit board arranged in the vacuum cleaner body outside the path of the air flow. The body of the pressure detector 24 may be fixed, for example, to the same circuit board 29 as the body of the pressure detector 14.

Preferably, this second detector 24 is coupled to the first detector 14 so as to provide a measurement of the pressure difference between the ends of the dust chamber. The difference between the average pressures obtaining at the measurement point 15 at the inlet of the dust chamber and at the measurement point 25 at the outlet of this chamber may be obtained in a simple manner. For this purpose, the pressure detector 24 is a differential detector, and a branch-off 28 is applied to the flexible tube which captures the pressure at measurement point 15 so as to provide this measured pressure simultaneously to the detector 14 at the inlet and to the detector 24 at the outlet of the dust chamber. Thus the detector 24 receives both pressures of the measurement points 15 and 25.

In modifications of this embodiment, the measuring point 25 may be on either side of the dust filter F1, i.e., either at the outlet 23b of the dust chamber 10, inside this dust chamber behind the dust bag 12, or alternatively in position 23b between the filter F1 and the suction side of the fan 23 inside the housing 20.

It should be noted that, in contrast to the vacuum cleaner disclosed by European Patent Application EP 0 467 347 cited as prior art, this pressure detector 24 arranged at the outlet of the dust chamber is not indispensable for the control of the working pressure of the vacuum cleaner, which control will be described further below. This second pressure detector 24 according to the invention is designed solely to improve the reliability of the floor type classification. If so desired, the measurement of the pressure difference may be used for deriving an indication of the degree of filling of the dust chamber.

In an embodiment, a possible aim is to detect the pressure conditions relating to three or four different floor types, for example, as disclosed in the cited prior-art document: thick carpet, thin carpet, straw mat, and hard, smooth surface; and it is possible to provide corresponding control states for the fan motor power.

Figure 3A:
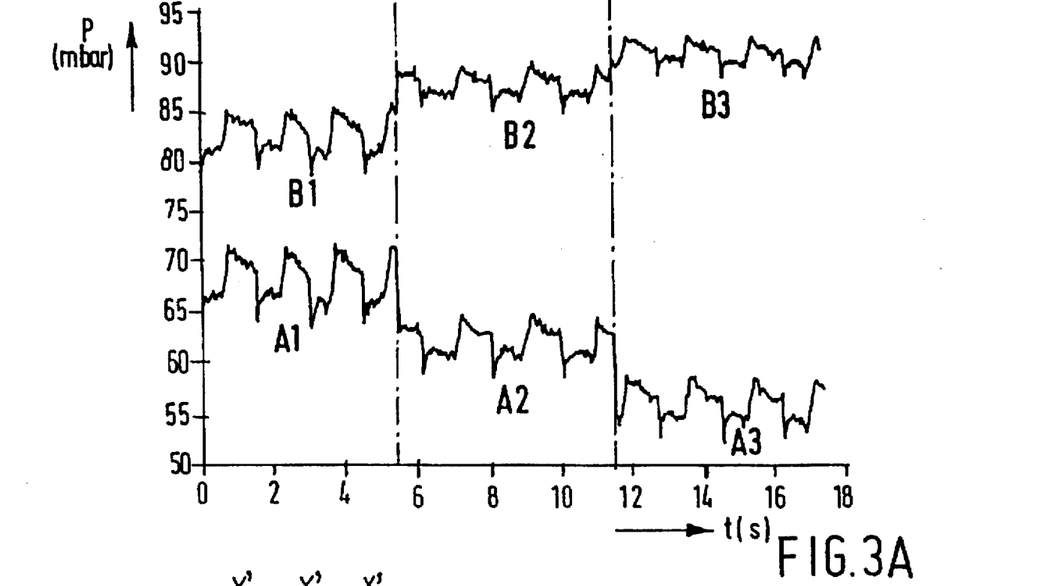
FIG. 3A shows the signals of the first and second pressure detector at a constant power of the main motor, with different degrees of fullness of the dust chamber, on a "CARPET" floor type.
Figure 3B:
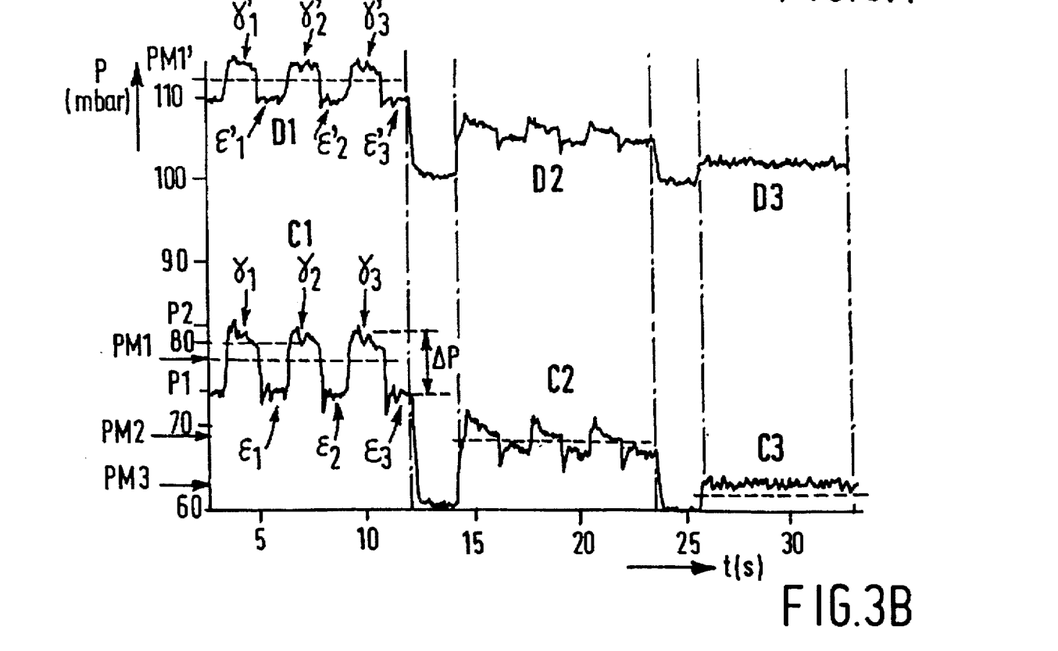
FIG. 3B shows the signals of the first and second pressure detector at a constant motor power and the same degree of fullness of the dust bag, for three different floor types.

The curves in FIGS. 3A and 3B illustrate the detection operation by the two pressure detectors 14 and 24.

Curve C in FIG. 3B shows the pressure P in mbar measured by detector 14 at the measuring point 15 at the inlet of the dust bag as a function of time t in seconds (s), and curve D in this same FIG. 3B shows the pressure P in mbar measured by detector 24 at measuring point 25 at the outlet of the dust bag as a function of time t in seconds. These measurements are carried out at a constant power of the motor 22 of fan 23, and with the same degree of filling of the dust bag for all portions of the curve.

It is noted that 1 bar=$10^5$ Pa (Pascal).

The portions C1 and D1 of the curve relate to a cleaning condition where the nozzle is moved to and fro over a floor fitted with a thick carpet having a long pile, while the portions C2 and D2 relate to a cleaning condition on a carpet of medium thickness, and the portions C3 and D3 relate to a cleaning condition on a hard surface.

The curves show in portions C1 and D1 on the one hand, and C2 and D2 on the other hand, oscillations comprising maxima $\gamma 1$, $\gamma 2$, $\gamma 3$ considered, for example, for C1, and minima $\in 1$, $\in 2$, $\in 3$ considered for the same curve C1 representing the pressure P at the inlet of the dust chamber when the nozzle carries out forward and return movements over a thick carpet. The pressure maxima, which are of the order of 82 mbar here, correspond to time durations of the order of 1.5 seconds during which the user pushes the nozzle over the carpet (forward). The pressure minima, which are of the order of 74 mbar here, correspond to time durations of the order of 1.5 seconds during which the user pulls the nozzle back over the carpet (return). The variation in the pressure P between the maxima $\gamma 1$, $\gamma 2$, $\gamma 3$ and the minima $\in 1$, $\in 2$, $\in 3$ is very abrupt: it corresponds to the change in direction of the nozzle between forward and return each time.

The slight irregularities appearing in the maxima and in the minima of the amplitude are due to noise and should be smoothed out during processing of the measured data. To achieve this smoothing, for example, a measurement may be made of the average amplitude value within a narrow time window smaller than the duration of a maximum or minimum, which is at least 0.6 s. This window may favourably have a width of 0.3 s.

The amplitude difference $\Delta P$ between the amplitude P2 of the maxima $\gamma 1$, $\gamma 2$, $\gamma 3$ and the amplitude P1 of the minima $\in 1$, $\in 2$, $\in 3$ in the example shown in FIG. 3B is of the order of 8 mbar for a carpet, the pressure being measured at the inlet of the dust chamber.

It can be seen in the same FIG. 3B that the portion D1 relating to the pressure measured behind the dust chamber under the same conditions as C1 also shows oscillations between the amplitudes corresponding to forward and return strokes of the nozzle. In curve D1, the maxima are referenced $\gamma' 1$, $\gamma' 2$, $\gamma' 3$ . . . , and the minima are referenced $\in' 1$, $\in' 2$, $\in' 3$. The average amplitude of the pressure between maxima and minima is referenced PM1'. But whereas the average amplitude PM' of the pressure (curve D) is greater behind the dust chamber (PM1'=approximately 108 mbar for D1) than the average amplitude PM (curve C) in front of the dust chamber (PM1=approximately 79 mbar for C1), the oscillations appearing behind the dust chamber (curve D) are more strongly attenuated: for a carpet, for example, the pressure amplitude difference $\Delta P$ between the forward and return strokes is approximately 6 mbar (curve D1) instead of 8 (curve C1), where the pressure is measured in front of the dust chamber. It is accordingly more favourable to place the pressure detector which acts as a floor type detector in front of the dust chamber rather than behind it.

The same observations may be made for the portions of the curves C2 and D2 relating to a less thick carpet, where the pressure in front of (curve C2) and behind (curve D2) the dust chamber, respectively, is shown.

The portions C3 and D3 relating to the situation in which the nozzle is moved to an fro on a hard surface show that the pressure amplitude is identical here for the forward and return strokes. No amplitude variation is apparent: there are neither maxima nor minima. Only a slight noise effect is observed.

By contrast, the determination of the average amplitudes of the pressure PM1 for thick carpet (curve C1), PM2 for medium carpet (curve C2), and PM3 for hard surface (curve C3) shows that this average amplitude varies from 78 mbar (C1) to 69 mbar (C2) and 64 mbar (C3). This average amplitude therefore varies with the nature of the floor surface. More in particular, it decreases from thick carpet via medium carpet to hard surface.

Curve A in FIG. 3A shows the pressure P in mbar measured by detector 14 at the measuring point 15 at the inlet of the dust chamber as a function of time t measured in seconds, and curve B in this same FIG. 3A shows the pressure P in mbar measured by the detector 24 at measuring point 25 at the outlet of the dust chamber as a function of time t measured in seconds. These measurements are carded out at a constant power of the motor 22 of fan 23, and on a medium carpet.

The portions A1 and B1 of the curve relate to a situation in which the dust chamber, for example provided with a dust bag, is empty, i.e. the bag is clean and new.

The portions A2 and B2 of the curve relate to a situation in which the dust bag has a filling of approximately 50%. It is immediately apparent from these curves that, as the dust chamber becomes fuller, the pressure at point 15 at the inlet of the dust chamber drops whereas the pressure at point 25 at the outlet of the dust chamber rises.

The portions A3 and B3 of the curve relate to the situation in which the dust bag is full. The pressure at point 15 is found to be a minimum, whereas at point 25 it is a maximum.

Whatever the filling condition of the dust chamber, the maxima and minima of the pressure corresponding to forward and return movements of the nozzle are always well measurable in the curves, and in particular in the curves A which correspond to the pressure being measured in front of the dust chamber.

The curves A and B in FIG. 3A show that a difference measurement of the avenge pressure can be carded out between the rear of the dust chamber, in measuring point 25, and the front of the dust chamber, in measuring point 15. The characteristics shown in FIG. 3B render it possible to achieve an exact detection of the floor type. To this end, the measurements of the first pressure detector 14 or floor type detector are reported to calculation means yet to be described below, i.e.:

the amplitudes P2 of the maxima γ1, γ2, . . . for each type of floor, the amplitudes P1 of the minima of the minima ∈1, ∈2, . . . for each type of floor, so as to evaluate subsequently:

the amplitude difference ΔP=P2−P1
the avenge amplitude: PM=(P1+P2)/2

The evaluation of the amplitude difference ΔP for each floor type in itself already facilitates a floor type classification. The evaluation of the avenge amplitude PM renders it possible to improve this classification. Then the evaluation, through the processing of the measurements of FIG. 3A, of the difference in average pressure between the inlet and the outlet: PM′−PM renders possible an additional improvement in this classification.

For the sake of simplicity, an embodiment will be described below in which the object is merely to detect two different floor types classified as "CARPET" and "HARD, SMOOTH FLOOR". It has been found in practice that this embodiment leads to a simple and inexpensive vacuum cleaner whose functions correspond optimally to the most frequently felt needs of the user. This detection of two possible states of different floor types will then lead on the one hand to a control of the fan motor power and on the other hand to an automatic switching of an electric brush arranged in the nozzle, if so desired.

In this embodiment, accordingly, means will also be described for activating the motor of an electric brush arranged in the nozzle, whenever the device detects a carpet, or for switching off this motor whenever the nozzle is to clean a hard and smooth floor.

In this embodiment, it is also possible to use the measurement of the two pressure detectors for providing an indication as to the degree of filling of the dust bag.

Figure 2:
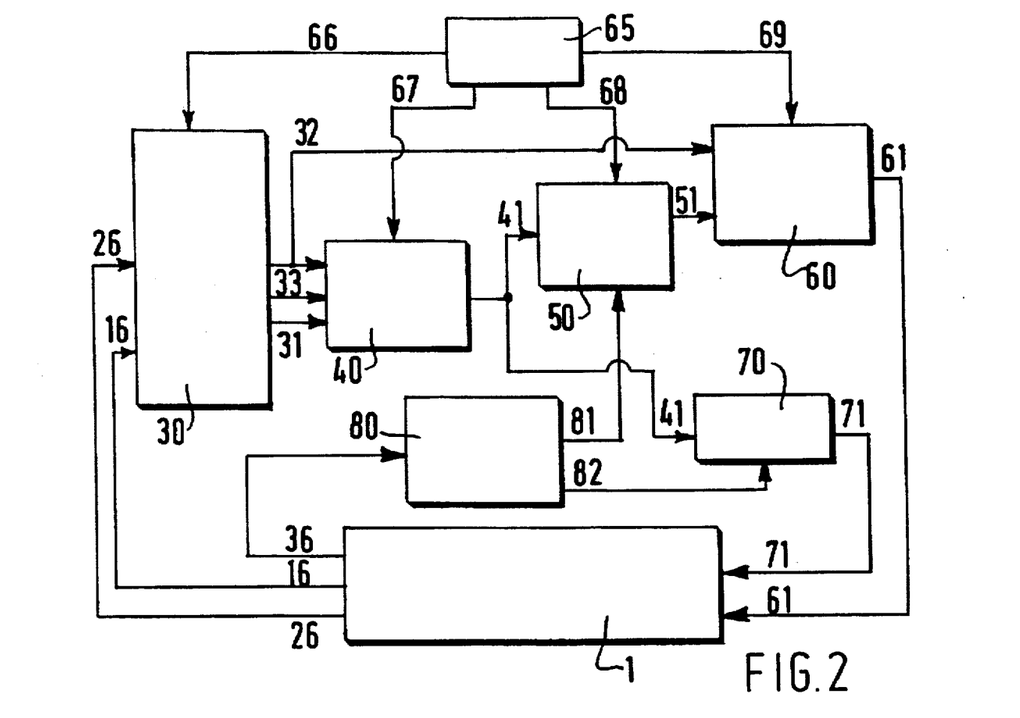
FIG. 2 is a block diagram of the vacuum cleaner and the means for processing the signals from the pressure detectors for controlling the main motor of the fan and an auxiliary motor of a brush in the nozzle.

FIG. 2 shows the floor type detection device which bases itself on the measurements 16 of the pressure detector 14 directed at the measuring point 15 situated at the inlet of the dust chamber, as shown in FIG. 3B (curve C), and which subsequently provides a control signal for the power of the main motor 22 for the fan 23 and, possibly, of the auxiliary brush motor (not shown).

This floor type detection signal processing device comprises:

a preprocessing block 30 which receives at its input the output signals 16 and 26 of the first and second pressure detectors, and which carries out a treatment called PREPROCESSING consisting in a calculation of:

the average pressure value PM of the oscillations of the output signal 16 of the first pressure detector 14 relative to the pressure obtaining at the input 11 of the dust chamber 12;

the amplitude difference ΔP between maxima and minima of the oscillations of the output signal 16 of the pressure detector 14 relative to that same pressure;

the difference between the average values (PM′−PM) of the pressures obtaining at the input 11 at measuring point 15 and at the output 23a or 23b of the dust chamber at measuring point 25.

This calculation is carried out during time periods or "time windows" T of a sufficient length, for example of 2 seconds, during which an average user carries out at least one change in direction of the nozzle between a forward and a return stroke on the floor to be cleaned during a normal cleaning operation while the vacuum cleaner is switched on.

It will be remembered that the floor type detector 14 has a measuring point 15 arranged in the body 1 of the vacuum cleaner, and that its output signal 16 is not dependent on the obligatory use of an electric brush in the nozzle.

The operations carried out by this preprocessing block 30, accordingly, are very simple. They merely relate to averaging on the one hand and to measurements on the other hand so as to calculate first the average amplitude PM of the input pressure of the dust bag, then to calculate the difference between the average pressures (PM′−PM) between the outlet and inlet of the dust bag, and also to detect the maxima $\gamma1$, $\gamma2$, $\gamma3$ and minima $\in1$, $\in2$, $\in3$ of the pressures coinciding with the forward and return strokes of the nozzle, and to calculate the amplitude differences $\Delta P$ between these maxima and minima.

On the other hand, the preprocessing block 30 carries out a slight smoothing of the measurement results so as to eliminate noise, as was stated above.

These calculations, accordingly, involve neither multiplications nor divisions, from which it follows that this preprocessing block 30 carrying out these operations may be very simple.

The outputs 31, 32, 33 of the preprocessing block 30 are connected to a neuron network or classifier block 40 which comprises:

1 to 3 inputs, 2 outputs for the signals to be calculated.

The three inputs of the neuron network or classifier block 40 are formed by the three output signals calculated by the preprocessing block 30:

- a signal 31 representing the maximum value of the amplitude difference $\Delta P$ between the maxima and minima of the pressure oscillations of the signal provided by the floor type detector 14. To eliminate the effect of noise on the maximum and minimum values, a smoothing operation may be carried out on the signal, for example, through calculation of the average value over the 0.3-s windows;
- a signal 32 representing the average pressure amplitude value PM, supplied by the floor type detector 14;
- a signal 33 representing the difference in average pressure amplitude (PM'−PM) between the outlet and the inlet of the dust chamber. The coefficients of the neuron network relative to this input may be low.

The neuron network or classifier block 40 comprises no more than two mutually complementary outputs:

CARPET,

HARD, SMOOTH FLOOR.

In this case, all specimens representing CARPET are the necessary opposite of HARD FLOOR, and vice versa. Moreover, it is possible to control not only the main fan motor 22 but also an auxiliary motor for the brush (not shown).

The neuron network block 40 thus provides two possible output signals at its output 41 which correspond to two complementary classes indicating the "CARPET" state and the "HARD FLOOR" state.

For example, the output signals may be:

for the first output: the output level is +1 when the "CARPET" state is detected and is −1 in the opposite case;

for the second output: the output level is +1 when the "HARD FLOOR" state is detected and is −1 in the opposite case.

Thus the sum of the output levels of the first and second outputs is zero. The output levels of the neuron network or classifier block 40 may be applied to a converter stage which provides a binary output 41 such that, for example, the level of this signal 41 is 1 for the "CARPET" state detected, and is 0 for the "HARD FLOOR" state detected.

In a preferred embodiment, the neuron network comprises, in the case in which it is the object to distinguish only between the "CARPET" state and the "HARD FLOOR" state:

3 inputs, a buried layer comprising 0 to 7 neurons, this number depending on the complexity of the problems to be solved, 2 outputs for the calculated signals, which may be combined into one output 41 as described above.

The complexity of the problems to be solved depends on the form of the signals representing the pressure oscillations (FIG. 3B). If these signals are substantially square, the problems are less complex than if these signals are partly triangular or severely disturbed by noise. The regularity of the signals depends to a large extent on the structure of the brush. If the brush gives off signals of poor quality, the neuron network will comprise a greater buried layer.

The output 41 of the neuron network or classifier block 40 is applied to a setpoint generating block 50 which provides a setpoint 51 for the average pressure amplitude PM to be achieved at the inlet of the dust chamber for a satisfactory cleaning of the detected floor type by means of a direct conversion as a function of the floor type.

This setpoint 51 is governed by simple rules, for example:

if the "CARPET" state has been detected, then the setpoint value is 80 mbar, if the "HARD FLOOR" state has been detected, then the setpoint value is 60 mbar.

Alternatively, the setpoint generating block 50 may be a fuzzy setpoint block. Thus it may happen, for example, that the network does not provide an output such as:

+1 corresponding to the state "CARPET" detected,

−1 corresponding to the state "HARD FLOOR" detected, but that the network provides an intermediate value at each of its outputs, for example +0.5 at the one and −0.5 at the other output (the sum being zero). The output 41 will also have a value intermediate between 1 and 0 then. In that case the setpoint generating block 50, if it is a fuzzy setpoint block, will apply the two rules given above, while taking into account the output value 41 of the neuron network, and balance the setpoint value determination so as to provide a value interpolated between the two rated setpoint values which correspond to the rated output values of the neuron network. For example, the setpoint value then is an interpolated value lying between 60 and 80 mbar.

Thus the fuzzy setpoint generating block interprets the output values of the neuron network in a fluent manner.

The fact that a pressure amplitude setpoint value is applied to the inlet of the dust chamber ensures that each floor to be cleaned is vacuumed at the most suitable pressure, because the curves of FIGS. 3A and 3B show that the detection at locations other than the inlet of the dust chamber gives a somewhat changed result.

According to the invention, moreover, this control in fact requires only one detector, which is the inlet pressure detector 14 in the example described, which renders possible simultaneously the detection of the floor type and the application of the pressure setpoint. As was seen above, the known vacuum cleaner according to the prior art was necessarily based on the use of two different detectors for carrying out these two functions. According to the invention, the two functions can be realised in an economical manner by a single pressure detector. Nevertheless, the neuron network can learn to take into account the signal 33 representing the pressure difference PM'−PM between the inlet and the outlet of the dust chamber, which will improve the reliability of the classification.

According to the invention, furthermore, the detection and thus the control of the setpoint value are achieved independently of the use of an electric brush in the nozzle.

This setpoint value for the average pressure amplitude 51 is reported to a controller 60 which compares the setpoint signal 51 with the average pressure amplitude PM 32 obtaining at the inlet of the dust chamber at that moment, and which provides a signal 61 for controlling the electric power of the main motor such that the correct pressure setpoint value is adjusted or maintained at the inlet of the dust chamber.

On the other hand, the output 41 of the neuron network or classifier block 40 may be connected to a second setpoint generating block 70 which provides a setpoint value 71 for the motor power of an electric brush situated in the nozzle 4 by means of a direct conversion as a function of the floor type.

This setpoint 71 is established by simple rules such as:

if the "CARPET" state is detected, then the command is given: auxiliary motor switched ON, if the "HARD FLOOR" state is detected, then the command is given: auxiliary motor switched OFF.

A fuzzy setpoint generating block 70 may alternatively be used for providing an intermediate power level between full power and zero to the brush motor.

In an alternative embodiment of the invention, the setpoint generating blocks 50, 70 may be rearranged so as to form a compact single setpoint generating block with only two inputs:

1 input relating to the pressure, 1 input relating to the floor type.

This version is not shown. Moreover, this compact setpoint generating block may again be a fuzzy setpoint generating block.

In FIG. 2, the vacuum cleaner provided with means as described above is in addition provided with a sequential command system 65. This system 65 forms a FINITE STATE unit which functions in accordance with the logic diagram of FIG. 4.

This sequential command system 65 automatically activates the preprocessing means 30, the classification means 40, the setpoint generating means 50, and the control means 60 in an appropriate order in time windows T of appropriate duration.

Arrangement of the learning base of the neuron network

The manufacture of the neuron network 40 takes place through the prior realisation of a learning base, whose arrangement will be described below, for the operation of the vacuum cleaner according to the invention.

To construct the neuron network according to the invention, first a suitable learning base is provided for the recognition of the floor type irrespective of the power of the main motor and irrespective of the degree of filling of the dust chamber, as well as a testing base; then the synaptic coefficients of the neuron network are determined.

The construction of the learning base includes the following steps:

1) the main motor 22 of the fan 23 is controlled at a first, constant electric power. Data provided by the first pressure detector 14 and by the second pressure detector 24 are registered during actual use with forward and return strokes of the nozzle:

1a) for different floor types, 1b) for different degrees of filling of the dust chamber.

2) the main motor 22 of the fan 23 is controlled at a second electric power, and subsequently at different other electric powers which are constant, while the data provided by the first and second detectors are again registered each time:

2a) for the same different floor type as above, 2b) for the same different degrees of filling of the dust chamber as above.

For this purpose, samples are available of the various floor types and of several dust bags 12 filled to different degrees with dust, which may be placed in the dust chamber 10 as required. As for the floor type samples, measurements are carried out on a certain number of floor types, among which thick carpets, those with a somewhat shorter pile, those which are slightly harder, down to hard and smooth floors.

The conditions of these measurements for constructing the learning base are illustrated in FIGS. 3A and 3B already described.

These measurements form important basic data. Tests are subsequently carried out with the use of the neuron network provided with appropriate coefficients for detecting its capacity to recognize floor types in situations similar to those in the learning phase. Thus the neuron network will eventually be capable of recognizing the floor type present in front of the nozzle:

irrespective of the electric power of the main motor, irrespective of the degree of filling of the dust chamber.

The vacuum cleaner according to the invention can carry out the recognition of the floor type and the automatic control of the electric motor power as described below by means of the neuron network realised under these conditions and by means of the sequential command system.

Floor type recognition operation

As was stated on the learning operation by the neuron network, the floor type recognition must be carried out at a constant power of the main motor.

The controller 60 of the main motor should accordingly be DE-ACTIVATED during the floor type recognition operation.

In fact, the floor type recognition operation is based on the detection of oscillations which in this case are amplitude oscillations of the pressure at the inlet of the dust bag which follow from the forward and return strokes of the nozzle pushed forward and retracted by the user during the cleaning operation.

It is clear that, if a signal showing an oscillation is applied to the input of the neuron network, and this oscillation is due to a variation in the electric power of the main motor, this electric power being changed by the controller 60, the neuron network 40 whose learning has been carried out at a constant electric power, will interpret this oscillation as that of a signal corresponding to the "CARPET" state, while in fact the nozzle may not be in contact with a CARPET at all.

The sequential command system 65 renders it possible to resolve these problems.

Figure 4:
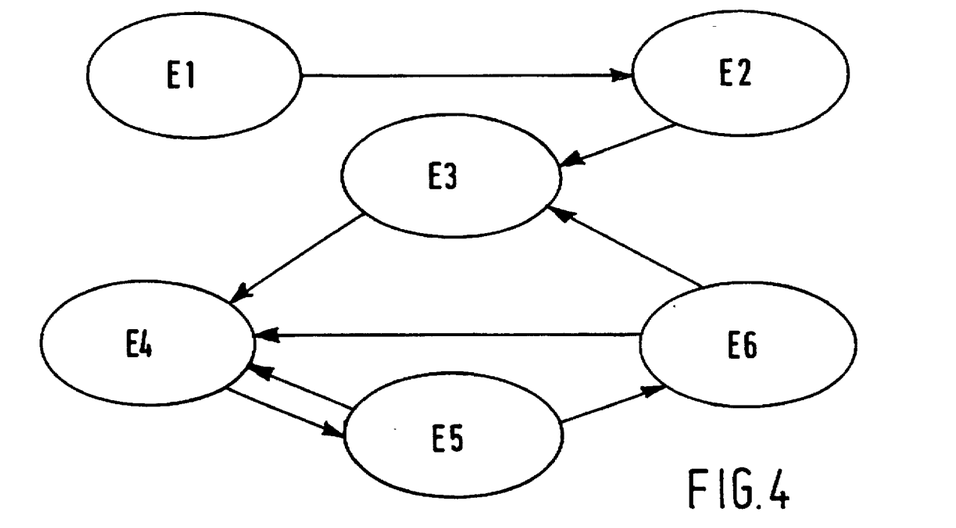
FIG. 4 illustrates the steps carried out in the implementation of the sequential command system for the control of the main motor.

The various STATES (referenced E1, E2, E3 etc. in FIG. 4) of this FINITE STATE unit are:

STATE 1/initialization, E1, a stage during which the variables such as pressure and time, etc., are reset to zero.

STATE 2/during this stage:

the fuzzy controller 60 is ACTIVATED to bring the pressure amplitude at point 15 to a certain starting value so as to be ready to recognize the floor type;

the neuron network 40 is DE-ACTIVATED.

STATE 3/during this stage the floor type is unknown:

the fuzzy controller 60 is now DE-ACTIVATED: i.e. the average pressure amplitude remains at the value which it has, i.e. the level to which it was brought in the preceding STATE 2/;

the preprocessing block 30 is ACTIVATED to register the data for a duration or "window" T3=2 seconds.

The duration T3 of 2 seconds is chosen to embrace at least one change in direction of the nozzle between a forward and a return stroke on the floor type to be detected during the cleaning operation carried out by an average user;

subsequently, the neuron network 40 is ACTIVATED and started upon its analysis operation.

Within the framework of the present embodiment of the invention, which is based on the assumption that only two states "CARPET" and "HARD FLOOR" are to be detected, the neuron network 40 always provides an indication because the two possible outputs are mutually complementary.

At the end of this STATE, accordingly, a FLOOR TYPE is DETECTED, and the system passes to the next STATE:

STATE 4/CONTROL: during this stage, a new setpoint 51 for the average pressure amplitude corresponding to the floor type detected in STATE 3/is available at the output of the setpoint generating block 50 and applied to the input of the controller 60. Accordingly:

the controller 60 is ACTIVATED;

simultaneously, the neuron network 40 is DE-ACTIVATED.

Possibly, if an electric brush is present, a command 71 is available at the output of the setpoint generating block 70 for the brush motor so as to switch this electric brush on or off.

The control time in STATE 4, T4, is limited, for example to 3 seconds, in order that the system does not remain too long in the control state.

In the normal run of operations, the correct value for the average pressure amplitude at the input 15 of the dust chamber is achieved in 2 to 3 seconds.

At point 61 (FIG. 2) the controller provides a signal which represents the power difference Δ to be provided to the motor in order to obtain the reduction in the error δ of the pressure PM at the input 15 of the dust chamber. Each pressure value 32 is stored in the memory by the controller 60 and power differences Δ are applied little by little until the pressure error δ is sufficiently reduced. This is why the controller receives the pressure 32 at its input.

The controller acts on the motor power, which implies that the pressure at the input of the dust chamber is adjusted irrespective of the mains voltage.

The system will enter the next STATE immediately if at the onset of STATE 4 the previously existing average pressure amplitude at the input of the dust chamber is already equal to the setpoint value determined at the onset of STATE 4/, or includes an error δ of no more than a few mbar.

In fact, it is not the object to obtain an error δ which is equal to zero for several reasons. The first is that the waiting time would be too long. The second is that there would be a risk of smoothing out the oscillations. Therefore, it is considered suitable to maintain an error of ±2 mbar during this stage on HARD FLOOR and ±6 mbar on CARPET, which corresponds to approximately half the amplitude of an oscillation on CARPET.

STATE 5/this STATE is a WAIT STATE during which simultaneously:

the motor power controller 60 is DE-ACTIVATED, the neuron network 40 is DE-ACTIVATED.

In this STATE, the system waits until the latest action on the motor 22 has finished producing its effects, so as to resume the analysis of the signals produced by the detectors 14 and 24, i.e. the analysis of possible variations in pressure at the input of the dust chamber corresponding to a possible change in floor type.

It may in fact occur that, at the moment the STATE 4 is left behind, the electric power of the motor has just been modified by the controller 60. It should then be taken into account that the entire system comprises time constants. For the motor only, this time constant is of the order of 0.3 seconds and the stabilization time is of the order of 1 second. The wait time accordingly is of the order of 0.8 to 1.5 s, depending on the degree of filling of the dust bag. During this time, the underpressure at the input of the dust chamber may be seen to change slightly owing to the variation imposed on the electric power of the motor.

Therefore, if the electric motor power has just been changed, the STATE 5 imposes a WAIT time.

On the other hand, if the electric motor power was not changed by the controller 60 in STATE 4, or if the motor power is stable during a phase T (time duration) longer than or equal to a given time, for example 0.9 seconds, the system leaves the WAIT state. Accordingly, the WAIT STATE 5 occupies the given time duration of the phase, for example, this maximum of 0.9 s, counted from the latest change in electric power imposed on the motor.

STATE 6/ANALYSIS: this STATE is comparable to STATE 3/:

the controller 60 is DE-ACTIVATED;

measurements are carried out by the detectors in a time window T6 of 2 s during which it may be assumed that oscillations will be produced due solely to changes in direction of the nozzle during a forward/return stroke over the floor to be cleaned as a result of the cleaning activities of the user. After these two seconds of ANALYSIS, the preprocessing block 30 provides the three values 31, 32 and 33;

the neuron network 40 is ACTIVATED.

The output of the neuron network 40 is applied to the setpoint generating block 50.

There are two possibilities for the output of the setpoint generating block 50:

either the setpoint remains unchanged: the process may then be accelerated because the system circulates through the STATES 4/, 5/, 6/.

It should in fact be borne in mind that, if the user remains on the same floor type for several minutes, which is usually the case, there will be no change in setpoint for the average pressure amplitude throughout the duration of the cleaning operation on this same floor type. Therefore, the system has no need to impose a modification on the controller 60. The system accordingly does not remain in STATE 4/ or in STATE 5/, but passes directly to STATE 6/.

In other words, as long as the floor type does not change, the system remains in the ANALYSIS STATE 6, and the cycle duration is at most the duration of the ANALYSIS time T6, i.e. 2 seconds:

or the setpoint must be changed before the system returns to STATE 4/.

In general the system will require at most the following times for the recognition of the floor types:

in STATE 4/: 3 seconds in STATE 5/: 0.9 seconds and in STATE 6/: 2 seconds.

This gives a total of 5 to 6 seconds assuming that there is a CONTROL or ADJUSTMENT of the power, which means that the system is capable of recognizing the floor types every 5 to 6 seconds in the embodiment described here. This is the longest cycle.

As soon as the user changes the floor type, the system calculates the new pressure setpoint value 51 and adjusts the motor power via the controller 60 so as to achieve this pressure setpoint. The moment this pressure is achieved, the controller 60 is no longer driven to change the power of motor 22, and the system remains in the ANALYSIS phase.

Whenever the neuron network calculates a change in floor type, its output signal 41 is applied not only to the setpoint generating block 50 but also to the setpoint generating block 70 for the brush motor, whose output 71 provides a new setpoint to the brush motor.

An advantage of the system is that, when the user stops his reciprocal movement and forgets to switch off the main motor, the system will automatically enter the position "HARD FLOOR" with all its consequences (pressure at the input of the dust chamber: low, brush motor switched off, if applicable).

Another advantage of the system is that, if the user leaves the vacuum cleaner for a moment with the nozzle in the air, the system will adjust itself to the "CARPET" position for a short moment. This position, however, does not last because the system immediately detects the absence of movement and subsequently puts itself into the economical HARD FLOOR position.

Depending on the structure of the brush used, it may alternatively be decided that the pressure setpoint for the "CARPET" state must be lower than the pressure setpoint for the "HARD FLOOR" state.

Practical embodiment of the preprocessing, classification, setpoint generating, control, and sequencing structures The preprocessing block 30, the neuron network 40, the setpoint generating block 50, the control block 60, and the sequencing block 65 are integrated into one microprocessor. The sequencing block commands the ACTIVATION and DE-ACTIVATION of the preceding blocks through connections 66 (commands to preprocessing block 30), 67 (commands to neuron network 40), 68; (commands for setpoint changes 50), and 69 (commands to controller 60). This microprocessor also comprises the setpoint generating block 70, if the latter exists.

In FIG. 2, the device according to the invention may in addition comprise a block 80 connected to the vacuum cleaner 1 by a connection line 36 which renders it possible to change the level of the setpoint 51 relating to CARPET or HARD FLOOR by means of a manual command 81, and to change the switching-on or off of the brush by means of a manual command 82. These variations applied to the setpoint generating blocks 50 and/or 70, respectively, are only taken into account in STATES 4 and 5 (E4 and E5 in FIG. 2), and not in STATE 6 (E6) so as not to interfere with the ANALYSIS.

It should be noted that, according to the invention, the pressure detector forming the floor type detector is preferably situated at the inlet of the dust chamber. Thus the disturbance formed by the dust chamber, the dust bag which forms a filter and the filter F1 is eliminated. Once the pressure setpoint 51 has been determined, the system has the function of applying this pressure setpoint to this same inlet of the dust chamber. This result will be obtained whatever the degree of filling of the bag, whatever the characteristics of the motor, whatever the mains voltage, etc., by demanding different power levels from the motor. Thanks to the CONTROL action, the motor power may have different values so as to achieve a given pressure at the inlet of the dust chamber corresponding to a given floor type. The cleaning efficiency is thus very good because one is assured of obtaining the correct working pressure irrespective of other conditions (filling of bag, motor, mains).

Furthermore, those skilled in the art know that there are three difficult situations in the operation of each and every vacuum cleaner.

DIFFICULT SITUATION NO. 1

This is the situation in which the nozzle catches a piece of paper or cloth and becomes obstructed. The flow then becomes a minimum. Under these conditions, in the vacuum cleaner known according to the prior art, the motor will run at maximum power. A motor running at maximum power is a disadvantage. First, it is noisy. Second, the motor is no longer cooled because the hose is obstructed. So it heats up. According to the invention, this disadvantage is automatically avoided. When the flow diminishes, the underpressure at the input increases and thus becomes greater than the maximum setpoint value for this underpressure, for example, that corresponding to CARPET. The pressure error δ increases under these conditions, the system enters the CONTROL state in order to reduce the motor power progressively as explained above in order that the underpressure at the input returns to its maximum setpoint value permitted. Moreover, the system according to the invention will not have detected a forward-return transition at the end of a cycle E4/E5/E6, so that the motor power will be reduced even more until the pressure at the input corresponds to that for HARD FLOOR, i.e. a low underpressure. This period of time will correspond to the time required by the user to ascertain whether a piece of paper or something else obstructs the nozzle. The object will accordingly be less firmly lodged.

DIFFICULT SITUATION NO. 2

This is the situation in which the user leaves the nozzle without contact with the floor, which happens practically always when the user abandons the vacuum cleaner for a few minutes without switching it off. While the nozzle is in the air, the flow in the hose will increase and the underpressure at the inlet of the dust chamber will become less, passing below the lowest setpoint. The controller 60 will thus tend to generate an increase in the motor power with the object of increasing the vacuum at the inlet. In this case, there is a risk of the motor being brought to maximum power, which is a disadvantage as stated above.

Therefore, according to the invention, flow restriction means are provided for limiting the flow in the vacuum cleaner so that this flow will never exceed a given value, which means act on the pressure at the measuring point 25, i.e. before and close to the motor to achieve that this underpressure will not fall below a certain threshold.

These means comprise calculation means for the pressure at point 25 based on the pressure measured by the detector 14 and the pressure difference measured by the detector 24, and control means for the motor power as a function of the pressure limit values previously registered for the measuring point 25. Thanks to these means, the motor power is reduced independently of the action of the controller 60 so that the pressure at measuring point 25 remains within the listed limits, which limits the flow in the vacuum cleaner hose independently of the circumstances. A hysteresis function is also provided to avoid oscillations in the proximity of the flow limit value.

Thus the two difficult situations have been given solutions. The use of the flow limitation means only, without other means according to the invention, do not render it possible to eliminate the disadvantages due to an obstruction in the vacuum cleaner hose. It is the combination of all means which leads to a solution in all difficult cases.

DIFFICULT SITUATION NO. 3

According to the invention, the most important information used for taking the decision CARPET or HARD FLOOR is that relating to the pressure oscillation shown in the curve of FIG. 3B. Whenever a major oscillation is generated, for example, exactly at the moment when the nozzle passes from a CARPET to a HARD FLOOR, or at any other sudden movement caused by the user, the system will tend to detect a CARPET state, whereas in fact the nozzle is on a HARD FLOOR, and it is necessary to wait for a subsequent cycle with a new ANALYSIS for the system to detect finally a HARD FLOOR. It is only at that moment that the decision to reduce the underpressure at the input and to switch off the brush will be taken. To avoid this problem, i.e. passing through a first state "CARPET" with the brush switched on and with a high depression at the inlet before finding the most suitable operating conditions for HARD FLOOR, which are the exact opposite with the brush switched off and a low depression at the inlet, the preprocessing block 30 is provided with means for selecting the direction of the pressure difference ΔP on the basis of which it provides the signal to the neuron network. Thus when a maximum γ is detected before a minimum ε for the calculation of the difference in pressure amplitude ΔP, the preprocessing block rejects this maximum and waits for the subsequent change in direction for carrying out the calculation of ΔP. The calculation is accordingly always carried out between a minimum ε followed by a maximum γ. When the nozzle is lifted, for example, the system thus does not detect an intermediate state CARPET anymore, which would be undesirable, but waits a little longer so as to obtain the suitable pressure variation. This solution eliminates the problem which would arise if, with the system having detected the CARPET state when the nozzle is lifted, the brash would remain switched on, which would be dangerous.

A difficult situation of the same kind, but the other way about, may arise when the user presses the nozzle violently against the floor. The CARPET state is then detected irrespective of the floor type detected during the first analysis cycle.

The system according to the invention is not designed to take into account this fact because there is no danger then in having the brush switched on and also because this state will last at most for a few seconds. Accordingly, the system will automatically take the correct decision in the next cycle, i.e. will either remain in the CARPET state or pass to the HARD FLOOR state.

We claim:

1. A vacuum cleaner comprising a vacuum cleaner body provided with an air inlet (11) and an air outlet (21), and a hose provided with a nozzle and coupled to the air inlet of the vacuum cleaner body, a dust chamber (10) in communication with the air inlet (11) and a housing (20) for a fan (23) driven by an electric motor (22), called main motor, which housing (20) is in communication with the dust chamber (10) and the air outlet (21), a flow path provided between said nozzle and said outlet comprising said hose, said vacuum cleaner in addition comprising:

detection means for detecting the characteristics of the floor type which is being cleaned and providing a signal indicative of said characteristics, preprocessing means (30), responsive to the signal provided by said detection means for evaluating these characteristics and providing a signal indicative of said evaluation, classification means (40) comprising a neural network, responsive to the signal provided by the preprocessing means, for recognizing and classifying the floor type which is being cleaned and providing a signal indicative of the resultant classification, set point generating means (50), responsive to the signal provided by said classification means for determining a pressure set point at said air inlet as a function of the floor type classification and providing a signal indicative of said pressure set point, main-motor control means (60), responsive to the signal provided by said set point generating means, for controlling the power of the main motor so as to maintain this pressure set point, which vacuum cleaner is characterized in that:

the detection means comprise a first pressure detector (14) whose measuring point (15) is directed at the inlet (11) of the dust chamber and which provides a signal which shows variations characteristic of the type of the floor being cleaned, and that there is also provided a sequential command system (65) for activating, in a given order and automatically, the preprocessing means (30), the classification means (40), the set point generating means (50) and the main-motor control means (60) during appropriate time periods.

2. A vacuum cleaner as claimed in claim 1, characterized in that it comprises in addition an electric brush arranged in the suction nozzle and control means (70) for the electric power of the motor of this brush, as a function of the calculated floor type.

3. A vacuum cleaner as claimed in claim 2, characterized in that the control means for the power of the brush motor comprise a setpoint generating block (70) for determining a control value (71) for the supply voltage of the brush motor through a direct conversion as a function of the detected floor type provided by the neural network (40) so as to provide that power which leads to a switching-on or switching-off of the brush arranged in the suction nozzle in dependence on the detected floor type.

4. A vacuum cleaner as claimed in claim 3, wherein the sequential command system is a FINITE STATE unit which comprises at least the following STATES:

STATE 4/CONTROL of the electric power of the main motor during a time T4 in which, a setpoint (51) for the average pressure amplitude of the first pressure detector 14 having been previously imposed, as well as a setpoint (71) for the brush motor:
   the control means (60) are ACTIVATED,
   the classification means (40) are DE-ACTIVATED, STATE 5/WAIT until the preceding STATE has finished producing its effects, during a time T5, taking into account the time constants of the elements;

STATE 6/ANALYSIS during a time T6 which embraces at least one change in direction of the nozzle on the floor during cleaning, during which:
   the control means (60) are DE-ACTIVATED;
   the preprocessing means (30) are ACTIVATED,
   the neural network (40) is ACTIVATED,
   the setpoint generating means (50) are ACTIVATED so as to determine:
     either a new setpoint (51) for the average pressure amplitude of the first pressure detector (14), and a setpoint (71) for the brush motor,
     or that the setpoints (51, 71) remain unchanged,
   subsequently, RETURN TO STATE 4/, then to STATE 5/, in which the system does not remain if the setpoints (51, 71) were unchanged.

5. A vacuum cleaner as claimed in claim 2 wherein the sequential command system is a FINITE STATE unit which comprises at least the following STATES:

STATE 4/CONTROL of the electric power of the main motor during a time T4 in which, a setpoint (51) for the average pressure amplitude of the first pressure detector 14 having been previously imposed, as well as a setpoint (71) for the brush motor:
the control means (60) are ACTIVATED,
the classification means (40) are DE-ACTIVATED, STATE 5/WAIT until the preceding STATE has finished producing its effects, during a time T5, taking into account the time constants of the elements;

STATE 6/ANALYSIS during a time T6 which embraces at least one change in direction of the nozzle on the floor during cleaning, during which:
the control means (60) are DE-ACTIVATED;
the preprocessing means (30) are ACTIVATED,
the neural network (40) is ACTIVATED,
the setpoint generating means (50) are ACTIVATED so as to determine:
either a new setpoint (51) for the average pressure amplitude of the first pressure detector (14), and a setpoint (71) for the brush motor,
or that the setpoints (51, 71) remain unchanged,
subsequently, RETURN TO STATE 4/, then to STATE 5/, in which the system does not remain if the setpoints (51, 71) were unchanged.

6. A vacuum cleaner as claimed in claim 1, characterized in that the sequential command system is a FINITE STATE unit which comprises at least the following STATES:

STATE 4/CONTROL of the electric power of the motor during a time T4 in which, a setpoint (51) for the average pressure amplitude of the first pressure detector 14 having been previously imposed, a setpoint (71) for the brush motor:
the control means (60) are ACTIVATED,
the classification means (40) are DE-ACTIVATED, STATE 5/WAIT until the preceding STATE has finished producing its effects, during a time T5, taking into account the time constants of the elements;

STATE 6/ANALYSIS during a time T6 which embraces at least one change in direction of the nozzle on the floor during cleaning, during which:
the control means (60) are DE-ACTIVATED;
the preprocessing means (30) are ACTIVATED,
the neural network (40) is ACTIVATED,
the setpoint generating means (50) are ACTIVATED so as to determine:
either a new setpoint (51) for the average pressure amplitude of the first pressure detector (14), and a setpoint (71) for the brush motor,
or the setpoints (51, 71) remain unchanged,
subsequently, RETURN TO STATE 4/, then to STATE 5/, in which the system does not remain if the setpoints (51, 71) were unchanged.

7. A vacuum cleaner as claimed in claim 1, characterized in that the neural network (40) provides two classes of signals at its output corresponding to the detection of two different surface states of the floor to be cleaned, which are a state "CARPET" and a state "HARD FLOOR".

8. A vacuum cleaner as claimed in claim 1 characterized in that it comprises means for limiting the pressure in the flow path, which means limits the motor power independently of the action of the control means (60) as a function of the average pressure detected by a second pressure detector arranged in the vacuum cleaner.

9. A vacuum cleaner as claimed in claim 1 characterized in that said vacuum cleaner comprises a differential, second pressure detector (24), coupled to said first pressure detector (14), having said measuring point (15) and a measuring point (25), directed to the outlet of the dust chamber, for providing a signal which is a function of the difference of the air pressure measured at the outlet (PM) and of the air pressure measured an at the inlet (PM') of the dust chamber (12) and that the neural network (40) determines the type of floor being cleaned as a joint function of the characteristics of the signal of the first pressure detector (14) (AP) (PM) and of the difference in amplitude between the first and second pressure detectors (PM'–PM).

10. A vacuum cleaner as claimed in claim 9, characterized in that, the signal of the first pressure detector on the one hand presenting quasi-periodical oscillations whose maxima ($\gamma$) and minima ($\epsilon$) correspond to the forward strokes and to the return strokes, respectively, of the suction nozzle over the floor during the vacuum cleaning operation, with a difference in amplitude ($\Delta P$) between these maxima and minima which varies in dependence on the type of floor being cleaned, and this signal on the other hand having an average amplitude (PM) which lies between the amplitudes of the maxima ($\gamma$) and minima ($\epsilon$) and which varies with the type of floor being cleaned, the neural network (40) determines the type of floor being cleaned as a joint function of the amplitude difference ($\Delta P$) between the maxima and the minima and of said average amplitude (PM) of the signal of the first pressure detector.

11. A vacuum cleaner as claimed in claim 10, characterized in that the preprocessing means (30) receive at their input the signal provided by the first pressure detector (14) and provide to the neuron network (40), as a result of said preprocessing:
a first signal (32) which is a function of said value (PM) of the pressure measured in the flow path by the first pressure detector;
a second signal (31) which is a function of the value of the difference in amplitude ($\Delta P$) between maxima ($\gamma$) and minima ($\epsilon$) of the oscillations of the pressure measured in the flow path by the first pressure detector (14); and in that the preprocessing means (30) receives the signal (26) provided by the second pressure detector (24) and supply to the neural network (40):
a third signal (33) which is a function of the value (PM'–PM) of the difference in pressure between the inlet and the outlet of the dust chamber.

12. A vacuum cleaner as claimed in claim 11, characterized in that the preprocessing means calculate the second signal (31) as a function of the value of the difference in amplitude ($\Delta P$) taking into account the first minimum ($\epsilon$) which is offered and the maximum ($\gamma$) which follows this first minimum, while disregarding any maximum which was offered prior to said first minimum.

13. A vacuum cleaner as claimed in claim 12 wherein it comprises in addition an electric brush arranged in the suction nozzle and control means (70) for the electric power of the motor of this brush as a function of the calculated floor type.

14. A vacuum cleaner as claimed in claim 13 wherein the sequential command system is a FINITE STATE unit which comprises at least the following STATES:

STATE 4/CONTROL of the electric power of the main motor during a time T4 in which, a setpoint (51) for the average pressure amplitude of the first pressure detector 14 having been previously imposed, as well as possibly a setpoint (71) for the brush motor:
the control means (60) are ACTIVATED,
the classification means (40) are DE-ACTIVATED, STATE 5/WAIT until the preceding STATE has finished producing its effects, during a time T5, taking into account the time constants of the elements;

STATE 6/ANALYSIS during a time T6 which embraces at least one change in direction of the nozzle on the floor during cleaning, during which:
   the control means (60) are DE-ACTIVATED;
   the preprocessing means (30) are ACTIVATED,
   the neural network (40) is ACTIVATED,
   the setpoint generating means (50) are ACTIVATED so as to determine:
      either a new setpoint (51) for the average pressure amplitude of the first pressure detector (14), and a setpoint (71) for the brush motor,
      or that the setpoints (51, 71) remain unchanged,
   subsequently, RETURN TO STATE 4/, then to STATE 5/, in which the system does not remain if the setpoints (51, 71) were unchanged.

15. A vacuum cleaner as claimed in claim 12 characterized in that the setpoint generating means (50) determine a setpoint value (51) for said average amplitude (PM) of the signal of the first pressure detector (14) as a function of the calculated floor type and that the control means (60 compare the setpoint value (51) with a measure for the average pressure (32) measured by the first pressure detector and determine a control value (61) for the electric power which permits the average amplitude (PM) of the signal of the first pressure detector to reach the setpoint value (51) to thereby control the suction pressure as a function of the calculated floor type.

16. A vacuum cleaner as claimed in claim 11 wherein it comprises in addition an electric brush arranged in the suction nozzle and control means (70) for the electric power of the motor of this brush as a function of the calculated floor type.

17. A vacuum cleaner as claimed in claim 16 wherein the sequential command system is a FINITE STATE unit which comprises at least the following STATES:

STATE 4/CONTROL of the electric power of the main motor during a time T4 in which, a setpoint (51) for the average pressure amplitude of the first pressure detector 14 having been previously imposed, as well as a setpoint (71) for the brush motor:
   the control means (60) are ACTIVATED,
   the classification means (40) are DE-ACTIVATED, STATE 5/WAIT until the preceding STATE has finished producing its effects, during a time T5, taking into account the time constants of the elements;

STATE 6/ANALYSIS during a time T6 which embraces at least one change in direction of the nozzle on the floor during cleaning, during which:
   the control means (60) are DE-ACTIVATED;
   the preprocessing means (30) are ACTIVATED,
   the neural network (40) is ACTIVATED,
   the setpoint generating means (50) are ACTIVATED so as to determine:
      either a new setpoint (51) for the average pressure amplitude of the first pressure detector (14), and a setpoint (71) for the brush motor,
      or that the setpoints (51, 71) remain unchanged,
   subsequently, RETURN TO STATE 4/, then to STATE 5/, in which the system does not remain if the setpoints (51, 71) were unchanged.

18. A vacuum cleaner as claimed in claim 11 characterized in that the setpoint generating means (50) determine a setpoint value (51) for said average amplitude (PM) of the signal of the first pressure detector (14) as a function of the calculated floor type and that the control means (60) compare the setpoint value (51) with a measure for the average pressure (32) measured by the first pressure detector and determine a control value (61) for the electric power which permits the average amplitude (PM) of the signal of the first pressure detector to reach the setpoint value (51) to thereby control the suction pressure as a function of the calculated floor type.

19. A vacuum cleaner as claimed in claim 18 wherein it comprises in addition an electric brush arranged in the suction nozzle and control means (70) for the electric power of the motor of this brush as a function of the calculated floor type.

20. A vacuum cleaner as claimed in claim 19 wherein the sequential command system is a FINITE STATE unit which comprises at least the following STATES:

STATE 4/CONTROL of the electric power of the main motor during a time T4 in which, a setpoint (51) for the average pressure amplitude of the first pressure detector 14 having been previously imposed, as well as a setpoint (71) for the brush motor:
   the control means (60) are ACTIVATED,
   the classification means (40) are DE-ACTIVATED, STATE 5/WAIT until the preceding STATE has finished producing its effects, during a time T5, taking into account the time constants of the elements;

STATE 6/ANALYSIS during a time T6 which embraces at least one change in direction of the nozzle on the floor during cleaning, during which:
   the control means (60) are DE-ACTIVATED;
   the preprocessing means (30) are ACTIVATED,
   the neural network (40) is ACTIVATED,
   the setpoint generating means (50) are ACTIVATED so as to determine:
      either a new setpoint (51) for the average pressure amplitude of the first pressure detector (14), and a setpoint (71) for the brush motor,
      or that the setpoints (51, 71) remain unchanged,
   subsequently, RETURN TO STATE 4/, then to STATE 5/, in which the system does not remain if the setpoints (51, 71) were unchanged.

21. A vacuum cleaner as claimed in claim 10 wherein it comprises a second pressure detector (25) for providing a signal which is a function of the difference in air pressure measured between the inlet (PM) and the outlet (PM') of the dust chamber (12), and in that the neural network (40) determines the type of floor being cleaned as a joint function of the characteristics of the signal of the first pressure detector (14) ($\Delta P$, PM) and of the difference in average amplitude between the first and second pressure detector (PM'-PM).

22. A vacuum cleaner as claimed in claim 10 wherein it comprises in addition an electric brush arranged in the suction nozzle and control means (70) for the electric power of the motor of this brush as a function of the calculated floor type.

23. A vacuum cleaner as claimed in claim 22 wherein the sequential command system is a FINITE STATE unit which comprises at least the following STATES:

STATE 4/CONTROL of the electric power of the main motor during a time T4 in which, a setpoint (51) for the average pressure amplitude of the first pressure detector 14 having been previously imposed, as well as a setpoint (71) for the brush motor:
   the control means (60) are ACTIVATED,
   the classification means (40) are DE-ACTIVATED, STATE 5/WAIT until the preceding STATE has finished producing its effects, during a time T5, taking into account the time constants of the elements;

STATE 6/ANALYSIS during a time T6 which embraces at least one change in direction of the nozzle on the floor during cleaning, during which:
 the control means (60) are DE-ACTIVATED;
 the preprocessing means (30) are ACTIVATED,
 the neural network (40) is ACTIVATED,
 the setpoint generating means (50) are ACTIVATED so as to determine:
  either a new setpoint (51) for the average pressure amplitude of the first pressure detector (14), and possibly a setpoint (71) for the brush motor,
  or that the setpoints (51, 71) remain unchanged,
 subsequently, RETURN TO STATE 4/, then to STATE 5/, in which the system does not remain if the setpoints (51, 71) were unchanged.

24. A vacuum cleaner as claimed in claim 9 wherein it comprises in addition an electric brush arranged in the suction nozzle and control means (70) for the electric power of the motor of this brush as a function of the calculated floor type.

25. A vacuum cleaner as claimed in claim 24 wherein the sequential command system is a FINITE STATE unit which comprises at least the following STATES:

STATE 4/CONTROL of the electric power of the main motor during a time T4 in which, a setpoint (51) for the average pressure amplitude of the first pressure detector 14 having been previously imposed, as well as a setpoint (71) for the brush motor:
 the control means (60) are ACTIVATED,
 the classification means (40) are DE-ACTIVATED,
 STATE 5/WAIT until the preceding STATE has finished producing its effects, during a time T5, taking into account the time constants of the elements;

STATE 6/ANALYSIS during a time T6 which embraces at least one change in direction of the nozzle on the floor during cleaning, during which:
 the control means (60) are DE-ACTIVATED;
 the preprocessing means (30) are ACTIVATED,
 the neural network (40) is ACTIVATED,
 the setpoint generating means (50) are ACTIVATED so as to determine:
  either a new setpoint (51) for the average pressure amplitude of the first pressure detector (14), and a setpoint (71) for the brush motor,
  or that the setpoints (51, 71) remain unchanged,
 subsequently, RETURN TO STATE 4/, then to STATE 5/, in which the system does not remain if the setpoints (51, 71) were unchanged.

* * * * *